US012680985B2

(12) United States Patent
Nagai et al.

(10) Patent No.: US 12,680,985 B2
(45) Date of Patent: Jul. 14, 2026

(54) ONLINE ANALYSIS SYSTEM

(71) Applicant: SHIMADZU CORPORATION, Kyoto (JP)

(72) Inventors: Yusuke Nagai, Kyoto (JP); Katsumasa Sakamoto, Kyoto (JP); Takuya Yoshioka, Kyoto (JP); Yosuke Iwata, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 275 days.

(21) Appl. No.: 18/624,658

(22) Filed: Apr. 2, 2024

(65) Prior Publication Data

US 2024/0385148 A1 Nov. 21, 2024

(30) Foreign Application Priority Data

May 18, 2023 (JP) ................................ 2023-082280

(51) Int. Cl.
| | |
|---|---|
| *G01N 30/14* | (2006.01) |
| *G01N 30/02* | (2006.01) |
| *G01N 30/20* | (2006.01) |

(52) U.S. Cl.
CPC ............. *G01N 30/14* (2013.01); *G01N 30/02* (2013.01); *G01N 30/20* (2013.01); *G01N 2030/201* (2013.01)

(58) Field of Classification Search
CPC ....... G01N 2030/065; G01N 2030/201; G01N 2030/202; G01N 2030/207; G01N 30/02; G01N 30/06; G01N 30/14; G01N 30/20; G01N 30/24; G01N 30/26; G01N 2030/027; G01N 30/22
USPC ...... 73/863, 863.12, 863.21, 863.45, 864.21, 73/864.63, 864.81, 61.56, 265, 863.86, 73/864.87
See application file for complete search history.

(56) References Cited

FOREIGN PATENT DOCUMENTS

WO WO-2018187745 A1 * 10/2018 .......... B01J 19/0033

* cited by examiner

*Primary Examiner* — John E Breene
*Assistant Examiner* — Truong D Phan
(74) *Attorney, Agent, or Firm* — Renner, Otto, Boisselle & Sklar, LLP

(57) ABSTRACT

Included are a sample supplier (2) configured to generate a sample fluid containing gas and liquid by causing two or more kinds of fluids to react with each other and to supply the sample fluid, a gas-liquid separator (4) provided downstream of the sample supplier (2), the gas-liquid separator (4) having a separation space (24) for separating gas and liquid in the sample fluid supplied from the sample supplier (2) from each other, a gas outlet (30) for releasing the gas in the sample fluid from the separation space (24), and a liquid outlet (28) for taking out the liquid in the sample fluid from the separation space (24), a liquid channel (32; 42) fluidly connected to the liquid outlet (28) of the gas-liquid separator (4), a back pressure regulator (8) provided on the liquid channel (32; 34), an analysis channel (38; 40) constituting a liquid chromatograph for analyzing the liquid separated from the gas in the gas-liquid separator (4), and a sampling part (6) configured to take out the liquid flowing through the liquid channel (32; 42) and introduce the liquid into the analysis channel (40) between the liquid outlet (28) and the back pressure regulator (8) on the liquid channel (32; 42).

3 Claims, 2 Drawing Sheets

ONLINE ANALYSIS SYSTEM

BACKGROUND OF THE INVENTION

1. Field of the Invention

The present invention relates to an online analysis system for online extraction and analysis of liquid from a sample fluid supplied in a gas-liquid two-phase flow state.

2. Description of the Related Art

In flow synthesis in the field of organic synthesis, processing of hydrogenating an organic raw material by causing the organic raw material and gas such as hydrogen gas to react with each other in a reactor is often performed. Reaction liquid produced in a reactor is delivered from reaction liquid delivery in a state of being mixed with unreacted hydrogen. For this reason, in general, a gas-liquid separator is provided downstream of a reactor to perform gas-liquid separation, and only reaction liquid is taken out from the gas-liquid separator.

In order to improve reaction efficiency in hydrogenation processing, high pressure is often applied to the inside of a reactor. In that case, a pressure resistant container is used as a gas-liquid separator provided downstream of the reactor. The pressure resistant container includes an inlet for allowing a fluid from the reactor to flow into the pressure resistant container, and two outlets for allowing gas and liquid separated from each other in the pressure resistant container to flow out from the pressure resistant container. A back pressure regulator (hereinafter, BPR) is often used to apply high pressure to the inside of the reactor, and the BPR is provided downstream of an outlet for liquid. The BPR is controlled, for example, so that a liquid level in the pressure resistant container is kept constant.

SUMMARY OF THE INVENTION

As a method of checking a synthesis situation in a reactor in the above flow synthesis, a method of using a fraction collector provided downstream of a BPR to collect, in a container, reaction liquid flowing out of a pressure resistant container, and moving the container in which reaction liquid collected to an analysis device such as a liquid chromatograph to perform analysis is generally used. In order to periodically check a synthesis situation, analysis of reaction liquid generated in a reactor is desirably executed periodically and automatically. However, in the above method, since work of moving a container in which reaction liquid is collected to the analysis device is necessary, it is difficult to automate analysis of reaction liquid.

The present invention has been made in view of the above problem, and an object of the present invention is to provide an online analysis system in which analysis of liquid in a sample fluid containing gas and liquid can be executed online.

An online analysis system according to the present invention includes a sample supplier configured to generate a sample fluid containing gas and liquid by causing two or more kinds of fluids to react with each other, and to supply the sample fluid, a gas-liquid separator provided downstream of the sample supplier, the gas-liquid separator having a separation space for separating gas and liquid in the sample fluid supplied from the sample supplier from each other, a gas outlet for releasing the gas in the sample fluid from the separation space, and a liquid outlet for taking out the liquid in the sample fluid from the separation space, a liquid channel fluidly connected to the liquid outlet of the gas-liquid separator, a back pressure regulator provided on the liquid channel, an analysis channel constituting a liquid chromatograph for analyzing the liquid separated from the gas in the gas-liquid separator, and a sampling part configured to take out the liquid flowing through the liquid channel and introduce the liquid into the analysis channel between the liquid outlet and the back pressure regulator on the liquid channel.

In a case of enabling transfer of liquid flowing out of the gas-liquid separator to an analysis device online, in a configuration in which the back pressure regulator is provided downstream of the liquid outlet of the gas-liquid separator, it is generally considered to additionally install a sampling part using a sample loop or a flow cell downstream of the back pressure regulator. However, on the downstream side of the back pressure regulator, since pressure of liquid rapidly decreases as compared with the upstream side of the back pressure regulator, gas dissolved in the liquid under high pressure appears in the liquid as a bubble, by which the inside of the sample loop or the flow cell may be in a state where the liquid and the gas are mixed. When the liquid in such a state is introduced into an analysis unit, an amount of the liquid provided to the analysis unit is not constant, and reproducibility of an analysis result is deteriorated. On the other hand, since the sampling part in the online analysis system of the present invention is configured to take out liquid flowing out from the liquid outlet and introduce liquid into an analysis unit at a position between the liquid outlet of the gas-liquid separator and the back pressure regulator, an amount of liquid to be analyzed is stabilized, and a highly reproducible analysis result can be obtained.

Since the online analysis system according to the present invention includes a sampling part that introduces liquid flowing out from a liquid outlet of a gas-liquid separator into an analysis unit, analysis of liquid in a fluid of a gas-liquid two-phase flow can be executed online. Furthermore, since the sampling part is configured to take out liquid flowing out from the liquid outlet and introduce the liquid into the analysis unit at a position between the liquid outlet of the gas-liquid separator and a back pressure regulator, an amount of liquid to be analyzed is stabilized, and a highly reproducible analysis result can be obtained.

DETAILED DESCRIPTION OF THE INVENTION

Hereinafter, an embodiment of an online analysis system according to the present invention will be described with reference to the drawings.

Figure 1:
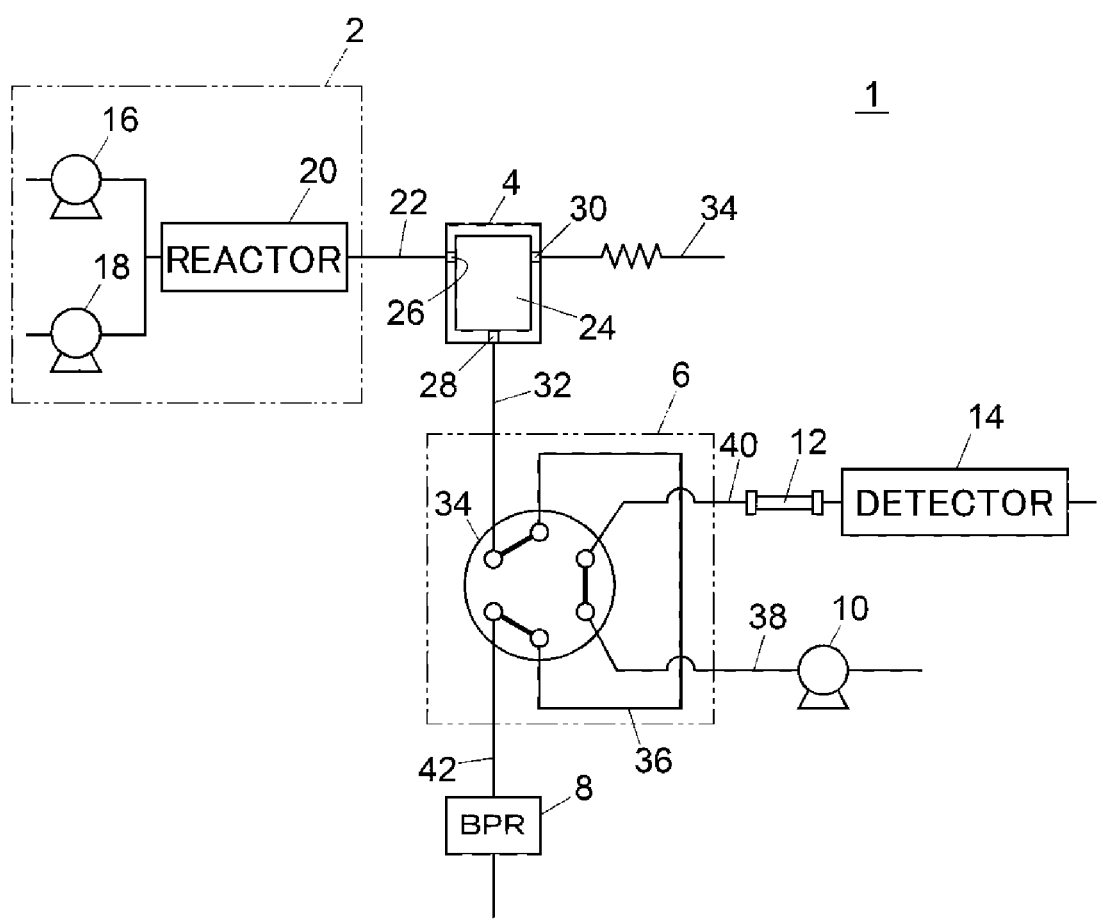
FIG. 1 is a schematic configuration diagram illustrating an embodiment of an online analysis system.

As illustrated in FIG. 1, an online analysis system 1 mainly includes a sample supplier 2, a gas-liquid separator 4, a sampling part 6, a back pressure regulator (BPR) 8, a liquid feeding pump 10, a separation column 12, and a detector 14.

The sample supplier 2 is a flow synthesis device that feeds liquid and gas into a reactor 20 by pumps 16 and 18 and synthesizes the liquid and the gas by causing them to react with each other. The liquid is, for example, an organic raw material. The gas is, for example, hydrogen. An outlet of the reactor 20 is fluidly connected to the gas-liquid separator 4 via a fluid supply channel 22. In the reactor 20, liquid synthesized with gas is mixed with unreacted gas to be in a gas-liquid two-phase flow state, and supplied to the gas-liquid separator 4 as a sample fluid through the fluid supply channel 22.

The gas-liquid separator 4 is a pressure resistant container, and includes a separation space 24 for separating liquid and liquid in a sample channel from each other, and includes a fluid inlet 26 for introducing a sample fluid supplied through the fluid supply channel 22 into the separation space 24, a liquid outlet 28 for allowing liquid separated from gas in the separation space 24 to flow out from the separation space 24, and a gas outlet 30 for allowing gas separated from liquid in the separation space 24 to flow out to the outside.

A liquid channel 32 is fluidly connected to the liquid outlet 28 of the gas-liquid separator 4, and a gas channel 34 having a channel resistance is fluidly connected to the gas outlet 30 of the gas-liquid separator 4. To the downstream side of the liquid channel 32, a liquid channel 42 is fluidly connected via a multi-port valve 34 described later. The BPR 8 is provided on the liquid channel 42. The BPR 8 is provided to make pressure in the reactor 20 high.

The sampling part 6 includes the multi-port valve 34 and a sample loop 36. The multi-port valve 34 includes six ports. The liquid channel 32, the liquid channel 42, one end of the sample loop 36, another end of the sample loop 36, an upstream side analysis channel 38, and a downstream side analysis channel 40 are connected to each port of the multi-port valve 34. The multi-port valve 34 can be switched to one of a first state (state in FIG. 1) in which the sample loop 36 is interposed between the liquid channel 32 and the liquid channel 42 and a second state (state in FIG. 2) in which the sample loop 36 is interposed between the upstream side analysis channel 38 and the downstream side analysis channel 40. The liquid feeding pump 10 for feeding a mobile phase is provided on the upstream side analysis channel 38, and the separation column 12 and the detector 14 are provided on the downstream side analysis channel 40. The upstream side analysis channel 38 and the downstream side analysis channel 40 constitute a liquid chromatograph for analyzing liquid extracted from a sample fluid in the gas-liquid separator 4.

Figure 2:
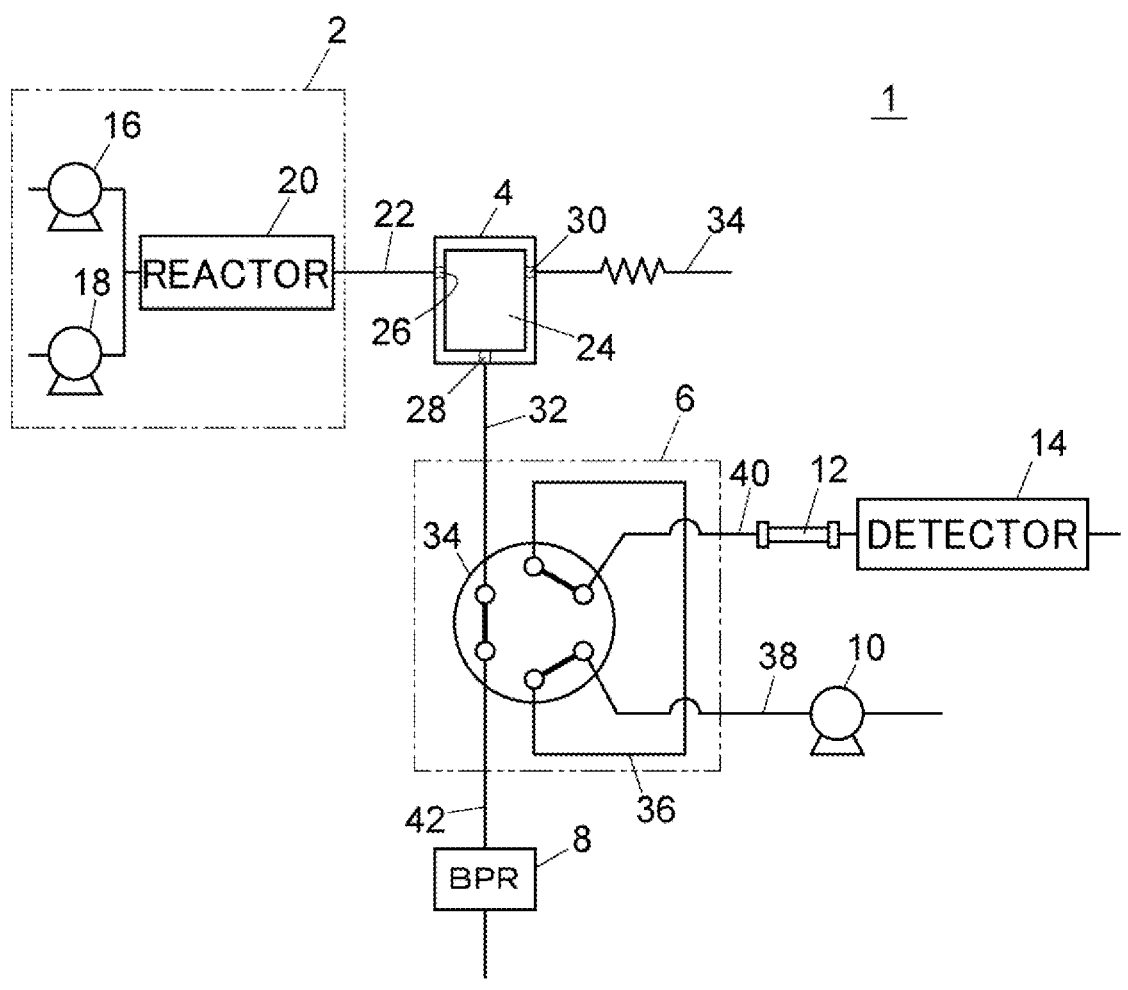
FIG. 2 is a diagram illustrating a state in which a sample loop is incorporated in an analysis channel in the embodiment.

When the multi-port valve 34 is in the first state, liquid flowing out of the gas-liquid separator 4 flows through a path of the liquid channel 32, the sample loop 36, and the liquid channel 42. When the multi-port valve 34 is switched to the second state, as illustrated in FIG. 2, the sample loop 36 is incorporated between the upstream side analysis channel 38 and the downstream side analysis channel 40, and liquid in the sample loop 36 is guided to the separation column 12 by a mobile phase from the liquid feeding pump 10. When liquid passes through the separation column 12 and the detector 14, a component in the liquid is analyzed.

As described above, in the online analysis system of the present embodiment, liquid flowing out of the gas-liquid separator 4 can be introduced into a mobile phase flowing through the analysis channels 38 and 42 only by switching of the multi-port valve 34. Furthermore, the sampling part 6 is provided at a position between the liquid outlet 28 of the gas-liquid separator 4 and the BPR 8, and is configured to introduce liquid flowing out of the gas-liquid separator 4 into the downstream side analysis channel 40 in a high pressure state, so that it is possible to sample gas dissolved in liquid without generation of the gas as a bubble, and quantitativity of liquid to be analyzed is maintained. By the above, high reproducibility of an analysis result can be obtained.

Note that the sample supplier 2 of the present embodiment is a flow synthesis device that generates a sample fluid containing gas and liquid by causing the gas and the liquid to react with each other, but the present invention is not limited to this, and a flow synthesis device that generates a sample fluid containing liquid and gas by causing liquid and liquid to react with each other may be used as the sample supplier.

Note that, in the above embodiment, the sampling part 6 is realized by the multi-port valve 34 and the sample loop 36, but the present invention is not limited to this. For example, a downstream end of the liquid channel 32 may be fluidly connected to an inlet of a flow vial, and an upstream end of the liquid channel 42 may be fluidly connected to an outlet of the flow vial, so that liquid flowing out from the liquid outlet 28 of the gas-liquid separator 4 constantly flows in the flow vial. In this case, the sampling part 6 includes a sampler that collects liquid flowing in the flow vial by a syringe pump through a needle and injects the collected liquid into the analysis channel 40 through an injection port.

The embodiment described above is merely an example of an embodiment of the online analysis system according to the present invention. The embodiment of the online analysis system according to the present invention is as described below.

An embodiment of the online analysis system according to the present invention includes a sample supplier configured to generate a sample fluid containing gas and liquid by causing two or more kinds of fluids to react with each other, and to supply the sample fluid, a gas-liquid separator provided downstream of the sample supplier, the gas-liquid separator having a separation space for separating gas and liquid in the sample fluid supplied from the sample supplier from each other, a gas outlet for releasing the gas in the sample fluid from the separation space, and a liquid outlet for taking out the liquid in the sample fluid from the separation space, a liquid channel fluidly connected to the liquid outlet of the gas-liquid separator, a back pressure regulator provided on the liquid channel, an analysis channel constituting a liquid chromatograph for analyzing the liquid separated from the gas in the gas-liquid separator, and a sampling part configured to take out the liquid flowing through the liquid channel and introduce the liquid into the analysis channel between the liquid outlet and the back pressure regulator on the liquid channel.

In a first aspect of the embodiment, the sampling part includes a sample loop for temporarily holding the liquid, and a switching valve configured to switch to either a first state or a second state, the first state being a state in which the sample loop is interposed between the liquid outlet and the back pressure regulator on the liquid channel and the second state being a state in which the sample loop is incorporated into the analysis channel.

In a second aspect of the embodiment, the sampling part includes a flow vial that is interposed between the liquid outlet and the back pressure regulator on the liquid channel at all times and has the liquid flowing through the inside of the flow vial, and a sampler that collects the liquid flowing in the flow vial and introduces the collected liquid into the analysis channel.

In a third aspect of the embodiment, the sample fluid is in a gas-liquid two-phase flow state.

DESCRIPTION OF REFERENCE SIGNS 1 online analysis system
2 sample supplier
4 gas-liquid separator
6 sampling part
8 back pressure regulator
10, 16, 18 pump
12 separation column
14 detector
20 reactor
22 fluid supply channel
24 separation space
26 fluid inlet
28 liquid outlet
30 gas outlet
32, 42 liquid channel
34 gas channel
36 sample loop
38 upstream side analysis channel
40 downstream side analysis channel

What is claimed is:
1. An online analysis system comprising:
a sample supplier configured to generate a sample fluid containing gas and liquid by causing two or more kinds of fluids to react with each other, and to supply the sample fluid;

a gas-liquid separator provided downstream of the sample supplier, the gas-liquid separator having a separation space for separating gas and liquid in the sample fluid supplied from the sample supplier from each other, a gas outlet for releasing the gas in the sample fluid from the separation space, and a liquid outlet for taking out the liquid in the sample fluid from the separation space;

a liquid channel fluidly connected to the liquid outlet of the gas-liquid separator;

a back pressure regulator provided on the liquid channel;

an analysis channel constituting a liquid chromatograph for analyzing the liquid separated from the gas in the gas-liquid separator; and a sampling part configured to take out the liquid flowing through the liquid channel and introduce the liquid into the analysis channel between the liquid outlet and the back pressure regulator on the liquid channel.

2. The online analysis system according to claim 1, wherein the sampling part includes:
a sample loop for temporarily holding the liquid; and
a switching valve configured to switch to either a first state or a second state, the first state being a state in which the sample loop is interposed between the liquid outlet and the back pressure regulator on the liquid channel and the second state being a state in which the sample loop is incorporated into the analysis channel.

3. The analysis system according to claim 1, wherein the sample fluid is in a gas-liquid two-phase flow state.

* * * * *